United States Patent Office 3,567,792
Patented Mar. 2, 1971

3,567,792
DIOLEFIN-OLEFIN CONDENSATION PROCESS
John E. Bozik, Pittsburgh, Harold E. Swift, Gibsonia, and Ching Yong Wu, Pittsburgh, Pa., assignors to Ameripol, Inc., Cleveland, Ohio
No Drawing. Filed Dec. 26, 1968, Ser. No. 787,257
Int. Cl. C07c 3/00
U.S. Cl. 260—677
18 Claims

ABSTRACT OF THE DISCLOSURE

Process for the preparation of triolefins comprising condensing diolefins and olefins in contact with a catalyst system comprised of: (1) a nickel salt, (2) an organoaluminum compound and (3) a secondary phosphine ligand.

BACKGROUND OF THE INVENTION

Field of the invention

This invention relates to a process for the preparation of triolefins through the condensation of diolefins and olefins in contact with a specific catalyst system.

Triolefins have heretofore been found useful as precursors of many specialty chemicals as well as monomers for polymer preparation or modification. For example, triolefins which exhibit terpene-like structures are useful intermediates in hte preparation of pharmaceuticals, perfumes, flavors and essential oils. In addition, triolefins can be readily converted to polyfunctional intermediates for reaction with dibasic acids or diamines to form nylon-like polymers. Moreover, these triolefins are readily polymerizable and are suitable comonomers for EPT rubbers. Still further, they can readily be converted to polymeric epoxides.

Although many useful applications exist for said triolefins, they have received relatively little attention in recent years because of their unavailability in commercial quantities. This is mainly attributable to the fact that available processes for triolefin preparation have generally resulted in an olefinic mixture wherein the triolefin was present in relatively small quantities necessitating the use of complex and expensive recovery procedures.

It is, therefore, an object of the present invention to provide an efficient process for the preparation of triolefins in high conversion and selectivity.

It is another object of the present invention to provide a relatively inexpensive and convenient process for the preparation of triolefins wherein through a choice of reactants, triolefins of specific structures can be tailored for specific end use applications.

SUMMARY OF THE INVENTION

These and other objects are accomplished in accordance with the present invention which provides a process for the preparation of triolefins which comprises condensing diolefins with an olefin in contact with a catalyst system comprised of (1) a nickel salt, (2) an organoaluminum compound and (3) a secondary phosphine ligand consisting at least in part of a 3,5-dioxa-1-phosphacyclohexane.

DESCRIPTION OF THE INVENTION

The diolefins which can be employed in accordance with the present invention are generally aliphatic and cycloaliphatic diolefin hydrocarbons, particularly the conjugated 1,3-diolefins such as butadiene-1,3, 1,3-pentadiene, 1,3-hexadiene, 2-chloro-1, 3-butadiene, isoprene, piperylene, 2-phenyl-1,3-butadiene, 1,3-cyclohexadiene and other similar diolefins. Generally, it is considered preferable to employ such readily available materials as butadiene, isoprene, and piperylene.

The olefins employed as the co-reactants can be straight chain aliphatic olefins or alpha olefins. For example, ethylene, propylene, butylene, styrene, alpha-methyl-styrene, tertiary butyl styrene, 4-methyl pentene-1, vinyl chloride, vinylidene chloride, perfluoroethylene, acrylonitrile, acrylic acid, methacrylic acid, methyl methacrylate, and other similar olefins.

The catalyst system is highly specific for the condensation of diolefins with olefins especially for the condensation of 1,3-diolefins with olefins containing from 2 to about 10 carbon atoms. It has been found that both organic and inorganic nickel salts, such as nickel chloride, nickel iodide, nickel bromide, nickel acetylacetonate, nickel naphthenate, dicyclopentadienyl nickel, and the like are useful in the present invention. Surprisingly, other closely related inorganic salts, such as ferric chloride, cobalt chloride and chromium chloride have been found to be ineffective for triolefin preparation with this catalyst system.

The nickel salts are reduced by organoaluminum compounds having the formula $R_{3-n}AlX_n$ wherein R is an alkyl group having from 1 to 10 carbon atoms, X is halogen or hydrogen, and $n$ is a number from 0 to 2. Illustrative of such compounds are the trialkyl aluminums such as triethyl aluminum, tri-normal butyl aluminum, triisobutyl aluminum and the like; the alkyl aluminum halides, such as diethyl aluminum chloride, diisobutyl aluminum iodide, and the like; the alkyl aluminum dihalides, such as ethyl aluminum dichloride, n-butyl aluminum dibromide, isobutyl aluminum dichloride and the like; the alkyl aluminum sesquihalides, such as alkyl aluminum sequiiodide and the like; and the organoaluminum hydrides such as diethyl aluminum hydride, di-normal butyl aluminum hydride and the like. It has been found that of the organoaluminum compounds described above, the trialkyl aluminum compounds are preferred with triethyl aluminum being most preferred.

The aluminum to nickel molar ratios found useful in the present invention range from about 1.0 to about 4.0 and preferably range from about 1.5 to about 3.0. It has been found that both the selectivity and conversion to the triene pass through a maximum at an aluminum to nickel molar ratio of about 2.0.

The secondary phosphine ligand which acts as a catalyst promoter in the catalyst system of the present invention is highly specific. The ligand, 3,5-dioxa-1-phosphacyclohexane, is represented by the structural formula:

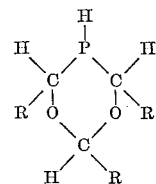

wherein R represents hydrogen and alkyl groups containing from 1 to about 10 carbon atoms. Illustrative of such compounds are 2,4,6-triethyl-3,5-dioxa-1-phosphacyclohexane, 2,4,6-tri-normal propyl-3,5-dioxa-1-phosphacyclohexane, 2,4,6 - triisopropyl-3,5-dioxa-1-phosphacyclohexane, 2,4,6 - tri-n-butyl-3,5-dioxa-1-phosphacyclohexane, 2,4,6 - triisobutyl-3,5-dioxa-1-phosphacyclohexane, 2,4,6-trioctyl - 3,5 - dioxa-1-phosphacyclohexane, 3,5-dioxa-1-phosphacyclohexane, and the like.

It has been found that other phosphines such as triphenyl phosphine, diphenyl phosphine, tri-normal butyl phosphine, tetraphenyl biphosphine and 1,2-bis(diphenylphosphino)ethane are not effective in triene preparation, but instead give a wide variety of products. It has been found, however, that as long as the catalyst promoter is comprised at least in part of a 3,5-dioxa-1-phosphacyclohexane, other phosphines can be employed conjointly provided they are present in amounts less than about 90% by weight.

The molar ratio of the phosphine catalyst promoter to the nickel salt ranges from about 0.1 to about 4.0 and preferably ranges from about 0.1 to about 1.1. The need for the catalyst promoter is demonstrated by the fact that very little reaction, i.e., about 7% conversion occurs when the promoter is not employed. Yet a phosphine to nickel molar ratio less than 1 is sufficient for an active catalyst system. It has been found that as the phosphine to nickel molar ratio increases, both the selectivity and conversion to the triene pass through maximum.

The reaction is preferably conducted in an inert organic hydrocarbon solvent. Preferably the solvent is aromatic in nature such as benzene, toluene, and the like. Generally, the catalyst components are added to the solvent before introducing the reactants thereto although any order of addition can be employed without adverse effects. The entire reaction is preferably conducted under anhydrous conditions in an inert atmosphere such as nitrogen, argon, helium, and the like.

The diolefin monomer concentration can vary with respect to the nickel component of the catalyst in molar ratios of from about 25 to about 200 and preferably from about 100 to about 175. It has been found that as monomer concentration increases, conversion and selectivity increases. Generally, two moles of the diolefin combine with one mole of the olefin to form the triolefin. Although the relative proportion of diolefin to olefin is not considered critical, it is preferred to maintain the relative proportions at about the stoichiometric requirement. It is considered most preferable to have the olefin present in excess of the stoichiometric requirement to insure complete reaction of the diolefin. An excess of from about 10 to about 100 percent is generally sufficient.

The reaction is conducted at temperatures which can vary over a rather broad range of from 0° to about 150° C. with temperatures of about 25° C. to 120° C. being preferred. It has been found that as the temperature increases, the conversion increases, however, the selectivity to the triene reaches a limiting value of about 60% at higher temperatures.

The system pressure can be conveniently controlled by the partial pressure of the olefin reactant. The system pressure can vary broadly from 100 to about 1,000 p.s.i. and preferably from about 200 to 500 p.s.i. Although high conversion can be maintained at relatively low pressures, i.e., at about 200 p.s.i., the selectivity to the triene is generally poorer than reactions conducted at higher pressures. Since low total pressure is essentially synonymous with a low concentration of available olefin, it is difficult to prevent an increase in diolefin oligomerization at the expense of olefin-diolefin condensation in accordance with the present invention. Accordingly, it is considered most preferable to operate within the range of from about 400 to about 500 p.s.i. total pressure.

The following examples are for purposes of illustration only and are not to be construed as limiting the invention in any manner:

EXAMPLE 1

To a chilled, 1000 ml. stainless steel autoclave which had been dried and purged with nitrogen was added a solution of 6 mmoles of nickel acetylacetonate (Ni(AA)$_2$) and 18 mmoles of 2,4,6-triisopropyl-3,5-dioxa-1-phosphacyclohexane (TIP) in 105 ml. of toluene. This was followed by addition of a solution of 12 mmoles of triethyl aluminum (TEA) in 105 ml. of toluene. The autoclave was then sealed and 600 mmoles of butadiene (previously weighed in a chilled steel bomb) was introduced. The autoclave was then pressurized to 200 p.s.i. with ethylene and heated to 100° C. The pressure was then adjusted with ethylene to give a total pressure of 500 p.s.i. Ethylene was added as needed during the course of the reaction to maintain the pressure at 500 p.s.i. Samples were withdrawn at intervals for GLC analysis and the reaction was stopped when most of the butadiene was reacted. The autoclave was then cooled to room temperature and depressurized, and the product recovered.

EXAMPLE 2

Employing the procedure described in Example 1, several additional runs were made employing different nickel salts to ascertain their effectiveness in triene preparation. Table I summarizes the results obtained:

TABLE I

| Nickel salt | Conversion (percent) | Selectivity to triene (percent) |
|---|---|---|
| NiCl$_2$ | 68 | 38 |
| Ni (AA)$_2$ | 87 | 73 |
| Ni (naphthenate) | 84 | 48 |

EXAMPLE 3

In a similar manner, various other phosphine ligands were compared to 2,4,6-triisopropyl-3,5-dioxa-1-phosphacyclohexane in their effectiveness as catalyst component in triene preparation. Table II summarizes the results obtained:

TABLE II

| Ligand | Conversion (percent) | Selectivity to triene (percent) |
|---|---|---|
| TIP | 87 | 73 |
| Triphenylphosphine | 83 | 19 |
| Diphenylphosphine | 87 | 24 |
| Tri-n-butyl phosphine | 83 | 20 |

EXAMPLE 4

In a similar manner, the condensation of butadiene with ethylene was attempted using the identical catalyst system except that the nickel salt was substituted with other closely related compounds especially, ferric chloride, cobalt chloride and chromium chloride. Table III summarizes the results obtained:

TABLE III

| Compound | Millimoles | Temp. (° C.) | Pressure (p.s.i.) | Time (hrs.) | Conversion (percent) | Selectivity to triene (percent) |
|---|---|---|---|---|---|---|
| FeCl$_3$ | 2 | 90 | 200 | 6 | 8 | 0 |
| CoCl$_2$ | 2 | 110 | 160 | 6 | 58 | 6 |
| CrCl$_3$ | 2 | 110 | 150 | 6 | 8 | 0 |

What is claimed is:

1. Process for the preparation of triolefins which comprises condensing diolefins with an acyclic olefin in contact with a catalyst system comprised of (1) a nickel salt, (2) an organo-aluminum compound and (3) a secondary phosphine ligand consisting at least in part of a 3,5-dioxa-1-phosphacyclohexane.

2. Process as defined in claim 1 wherein the organo-aluminum compound and the nickel salt are present in the catalyst system in Al/Ni molar ratios ranging from about 1.0 to about 4.0.

3. Process as defined in claim 2 wherein the Al/Ni molar ratio ranges from about 1.5 to about 3.0.

4. Process as defined in claim 1 wherein the molar ratio of the secondary phosphine ligand to the nickel salt ranges from about 0.1 to about 4.0.

5. Process as defined in claim 4 wherein the molar ratio of the secondary phosphine ligand to nickel salt ranges from about 0.1 to about 1.5.

6. Process as defined in claim 1 wherein the reaction is conducted in an inert organic hydrocarbon solvent.

7. Process as defined in claim 1 wherein the reaction is conducted at temperatures ranging from about 0° C. to about 150° C.

8. Process as defined in claim 1 wherein the system pressure ranges from about 100 to about 1,000 p.s.i.

9. Process as defined in claim 8 wherein the system pressure ranges from about 200 to 500 p.s.i.

10. Process as defined in claim 1 wherein the molar ratio of diolefin monomer to nickel salt ranges from about 25 to about 125.

11. Process as defined in claim 10 wherein the molar ratio of diolefin monomer to nickel salt ranges from about 50 to about 100.

12. Process as defined in claim 1 wherein the nickel salt is an inorganic nickel salt.

13. Process as defined in claim 1 wherein the nickel salt is an organic nickel salt.

14. Process for the preparation of triolefins which comprises condensing diolefins with an acyclic olefin in contact with a catalyst system comprised of (1) a nickel salt, (2) a trialkyl aluminum compound and (3) a secondary phosphine ligand consisting at least in part of a 3,5-dioxa-1-phosphacyclohexane.

15. Process as defined in claim 14 wherein the nickel salt is an inorganic nickel salt.

16. Process as defined in claim 14 wherein the nickel salt is an organic nickel salt.

17. Process as defined in claim 14 wherein the trialkyl aluminum is triethyl aluminum.

18. Process as defined in claim 14 wherein the phosphine ligand is comprised of a 3,5-dioxa-1-phosphacyclohexane and less than about 90% by weight of another phosphine.

References Cited

UNITED STATES PATENTS

| | | | |
|---|---|---|---|
| 3,485,881 | 12/1969 | Zuech | 260—666 |
| 3,392,208 | 7/1968 | Schneider | 260—677 |
| 3,392,209 | 7/1968 | Schneider | 260—677 |
| 3,457,319 | 7/1969 | Olechowski et al. | 260—677 |
| 3,219,716 | 11/1965 | Wittenberg et al. | 260—666 |
| 3,408,418 | 10/1968 | Iwamoto et al. | 260—680 |
| 3,346,608 | 10/1967 | Kutepon et al. | 260—439 |
| 3,306,948 | 2/1967 | Kealy | 260—680 |

DELBERT E. GANTZ, Primary Examiner

V. O'KEEFE, Assistant Examiner

U.S. Cl. X.R.

260—666